(12) United States Patent
Klein et al.

(10) Patent No.: US 11,269,651 B2
(45) Date of Patent: Mar. 8, 2022

(54) REUSING ADJACENT SIMD UNIT FOR FAST WIDE RESULT GENERATION

(71) Applicant: INTERNATIONAL BUSINESS MACHINES CORPORATION, Armonk, NY (US)

(72) Inventors: Michael Klein, Schoenaich (DE); Nicol Hofmann, Leinfelden-Echterdingen (DE); Cedric Lichtenau, Stuttgart (DE); Osher Yifrach, Modiin (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/565,946

(22) Filed: Sep. 10, 2019

(65) Prior Publication Data

US 2021/0073000 A1 Mar. 11, 2021

(51) Int. Cl.
*G06F 9/38* (2018.01)
*G06F 9/30* (2018.01)

(52) U.S. Cl.
CPC .......... *G06F 9/3887* (2013.01); *G06F 9/3013* (2013.01); *G06F 9/30018* (2013.01); *G06F 9/30036* (2013.01)

(58) Field of Classification Search
CPC .................................................... G06F 9/3887
See application file for complete search history.

(56) References Cited

U.S. PATENT DOCUMENTS

| 4,766,564 | A | * | 8/1988 | DeGroot | ................. G06F 7/483 708/507 |
| 5,513,366 | A | | 4/1996 | Agarwal | |
| 5,903,772 | A | * | 5/1999 | White | ................. G06F 9/30014 712/33 |
| 6,029,244 | A | * | 2/2000 | Oberman | ............ G06F 9/30014 712/223 |

(Continued)

FOREIGN PATENT DOCUMENTS

WO 2018134694 A1 7/2018

OTHER PUBLICATIONS

Transmittal Form PTO/SB/21, signed Mar. 17, 2020.
(Continued)

*Primary Examiner* — Michael J Metzger
(74) *Attorney, Agent, or Firm* — Cantor Colburn LLP; Edward Wixted (57) ABSTRACT

A system for processing instructions with extended results includes a first instruction execution unit having a first result bus for execution of processor instructions. The system further includes a second instruction execution unit having a second result bus for execution of processor instructions. The first instruction execution unit is configured to selectively send a portion of results calculated by the first instruction execution unit to the second instruction execution unit during prosecution of a processor instruction if the second instruction execution unit is not used for executing the processor instruction and if the received processor instruction produces a result having a data width greater than the width of the first result bus. The second instruction (Continued)

execution unit is configured to receive the portion of results calculated by the first instruction execution unit and put the received results on the second results bus.

17 Claims, 5 Drawing Sheets

(56) References Cited

U.S. PATENT DOCUMENTS

| | | | |
|---|---|---|---|
| 6,260,133 B1* | 7/2001 | Teruyama | G06F 9/30014 |
| | | | 712/208 |
| 6,308,252 B1* | 10/2001 | Agarwal | G06F 9/30014 |
| | | | 712/20 |
| 7,694,112 B2 | 4/2010 | Barowski | |
| 8,725,990 B1 | 5/2014 | Karandikar et al. | |
| 2008/0077928 A1 | 3/2008 | Matsuzaki et al. | |
| 2010/0306505 A1 | 12/2010 | Williamson | |
| 2013/0159682 A1* | 6/2013 | Eldeeb | G06F 9/3824 |
| | | | 712/222 |
| 2014/0115301 A1* | 4/2014 | Sanghai | G06F 9/30065 |
| | | | 712/220 |
| 2017/0097824 A1 | 4/2017 | Elmer | |
| 2017/0168837 A1 | 6/2017 | Eisen et al. | |

OTHER PUBLICATIONS

International Search Report and Written Opinion for International Application No. PCT/IB2020057461; International Filing Date: Aug. 7, 2020; dated Nov. 23, 2020, 7 pages.

* cited by examiner

REUSING ADJACENT SIMD UNIT FOR FAST WIDE RESULT GENERATION

BACKGROUND

The present invention relates to the field of computer systems, and more specifically, to reusing adjacent SIMD (single instruction, multiple data) units for processing instructions producing wider width results.

To improve computation performance in the face of decreasing benefit from generational silicon technology improvements, designs have moved to implement more complex computation primitives. In general-purpose microprocessors, such computation primitives often take the form of expanded instruction sets implemented on accelerators coupled tightly to a processor core charged with implementing the standard (legacy) set of instructions. Such accelerators implement a short-vector SIMD computation model, whereby each instruction specifies an operation to be performed across a wide data word, which, depending on the particular instruction, is interpreted as a vector of a small number (1-16) of sub-words. A single instruction may then specify multiple operations on multiple pieces of data.

SUMMARY

Embodiments of the present invention are directed to a system for processing instructions with extended results. The system includes a first instruction execution unit having a first result bus for execution of processor instructions. The system further includes a second instruction execution unit having a second result bus for execution of processor instructions. The second instruction execution unit is communicatively coupled to the first instruction execution unit. The first instruction execution unit is configured to selectively send a portion of results calculated by the first instruction execution unit to the second instruction execution unit during prosecution of a processor instruction if the second instruction execution unit is not used for executing the processor instruction. The second instruction execution unit is configured to receive the portion of results calculated by the first instruction execution unit and put the received results on the second results bus.

Embodiments of the present invention are directed to a method for processing instructions with extended results. The method includes determining if a received processor instruction produces a result having a data width greater than the width of a first result bus of a first instruction execution unit and greater than the width of a second result bus of a second instruction execution unit. A determination is made if the second instruction execution unit is not utilized for executing the received processor instruction, in response to determining that the received processor instruction produces the result having a data width greater than the width of the first result bus and greater than the width of the second result bus. The second instruction execution unit is communicatively coupled to the first instruction execution unit. A portion of results calculated by the first instruction execution unit is selectively sent to the second result bus of the second instruction execution unit during execution of the processor instruction, in response to determining that the second instruction execution unit is not used for executing the processor instruction.

Embodiments of the invention are directed to a computer-program product for processing instructions with extended results. The computer-program product includes a computer-readable storage medium having program instructions embodied therewith. The program instructions are executable by a processor to cause the processor to perform a method. A non-limiting example of the method includes determining if a received processor instruction produces a result having a data width greater than the width of a first result bus of a first instruction execution unit and greater than the width of a second result bus of a second instruction execution unit. A determination is made if the second instruction execution unit is not utilized for executing the received processor instruction, in response to determining that the received processor instruction produces the result having a data width greater than the width of the first result bus and greater than the width of the second result bus. The second instruction execution unit is communicatively coupled to the first instruction execution unit. A portion of results calculated by the first instruction execution unit is selectively sent to the second result bus of the second instruction execution unit during execution of the processor instruction, in response to determining that the second instruction execution unit is not used for executing the processor instruction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Generally, processors with single instruction, multiple data (SIMD) architectures are designed to maximize the amount of parallel processing in the instruction pipeline. In a SIMD architecture, the same instruction is executed in parallel to process multiple data inputs. A SIMD instruction specifies the execution and branching behavior of a single control thread controlling operations on a vector of multiple data inputs. A vector is an instruction operand containing a set of data elements packed into a one-dimensional array. The elements can be integer or floating-point values. Most SIMD instructions operate on vector operands. Vectors are also called SIMD operands or packed operands. Operand and data path width defines how much data can be processed at once; wider data paths can perform more complex functions, but generally this comes at a higher implementation cost. Furthermore, some vector instructions produce wider-width results, as compared to instruction input elements. Exemplary instructions that produce wider results include, but are not limited to, instructions to convert data to larger data formats, multiplication operations, and the like. Binary floating-point numbers may be represented in any of three data formats: short, long, or extended. As non-limiting examples, the short format includes 32 bits, the long format 64 bits, and the extended format 128 bits. Accordingly, conversion from the short format to the long format or from the long format to the extended format produces wider-width results. Due to wiring limitations on the chip, the result buses utilized by the SIMD execution units in conventional data processing systems provide results that are limited in size. It should be noted that conventional data processing systems perform the aforementioned operations producing wider results over multiple instruction cycles even if an adjacent SIMD execution unit is currently unused. This inefficiency effectively reduces throughput of the data processing system and increases latency.

Conventional data processing systems address these issues using different approaches. Some conventional systems employ a split-instruction transaction model with pipelined operation. This model requires a minimum of two coprocessors, where the instruction is divided into a low and high portion and each coprocessor executes corresponding portions. With this approach, a minimum of two coprocessor instructions are required to execute an operation in the coprocessor and retrieve the operation result from the coprocessor. For example, a first coprocessor may perform the high portion of the multiplication operation, while a second processor may perform the low portion of the multiplication operation. By contrast, embodiments of the present invention employ a single transaction model, where only a single coprocessor instruction is required to initiate the operation and provide the result of the operation.

Generally, pipelining increases central processing unit (CPU) performance predominantly through the reduction of cycles per instruction (CPI), although it can also reduce the CPU clock period to a lesser extent. Pipelining is a technique whereby instruction execution is broken down into a series of steps. Each step in the pipeline, known as a pipestage, completes a designated portion of an instruction's complete execution. Each pipestage adds to the execution in the same way that the station of an assembly line adds to the complete manufacture of a product. The instruction leaves the pipeline's final pipestage completely executed, just as a product leaves the assembly line completely assembled.

Ideally, a number of instructions equal to the number of pipestages comprising the pipeline may be overlapped in execution, each instruction occupying a different pipestage. If the CPU has sufficient resources, and earlier pipestages do not depend upon the completed results of later pipestages, each pipestage can independently perform its function (on the instruction currently occupying it) in parallel with the other pipestages. Further, if the average time a CPU requires to completely execute an instruction is divided equally between the pipestages, the speedup in CPU throughput for pipelined execution over sequential execution will be equal to the number of pipelined stages. Thus, for an ideal pipeline comprised of five pipestages, five instructions will be executed in the average time required to execute one instruction sequentially; the speedup in throughput is five times. Notice that the pipeline does not decrease the average time to execute a single instruction, but rather decreases overall average execution time by completing more instructions per unit of time.

To handle the wider results generated by execution of floating-point operations, some pipelined data processing systems use multiple cycles (as many as needed to complete the operation) to write the results. This approach requires blocking the pipeline until the register Write Back (WB) operation is complete. It should be noted that both aforementioned approaches employed by conventional data processing systems reduce the bandwidth and increase latency because they require multiple instructions to generate a result of an operation and/or they require multiple cycles to write the result. Another drawback of the aforementioned approaches is that they require additional multiplexing capabilities to recombine data elements associated with the result of the performed operation. Yet another drawback is that the extra instructions that are required due to the necessity to rearrange data between processing stages reduce the code density and require more storage in memory and in cache. It should be noted that each additional cycle required during data forwarding stage typically results in increase of processor's workload.

A different conventional approach of processing instructions that generate wider outputs is to utilize a wider data bus. However, this solution is not very efficient either because of additional complexity in design and higher implementation cost. At the same time, this particular solution typically results in underutilization of the wider data bus, because only a limited number of instructions would require such capability.

Generally, vector SIMD engines with dedicated instructions providing larger outputs and having lane masking capabilities can be employed to solve a number of contemporary problems. For example, at least some Artificial Intelligence (AI) engines process small precision inputs to accumulate and generate higher precision outputs. Embodiments of the present invention address all of the aforementioned problems by utilizing unused adjacent SIMD engines to generate wider results.

Figure 1:
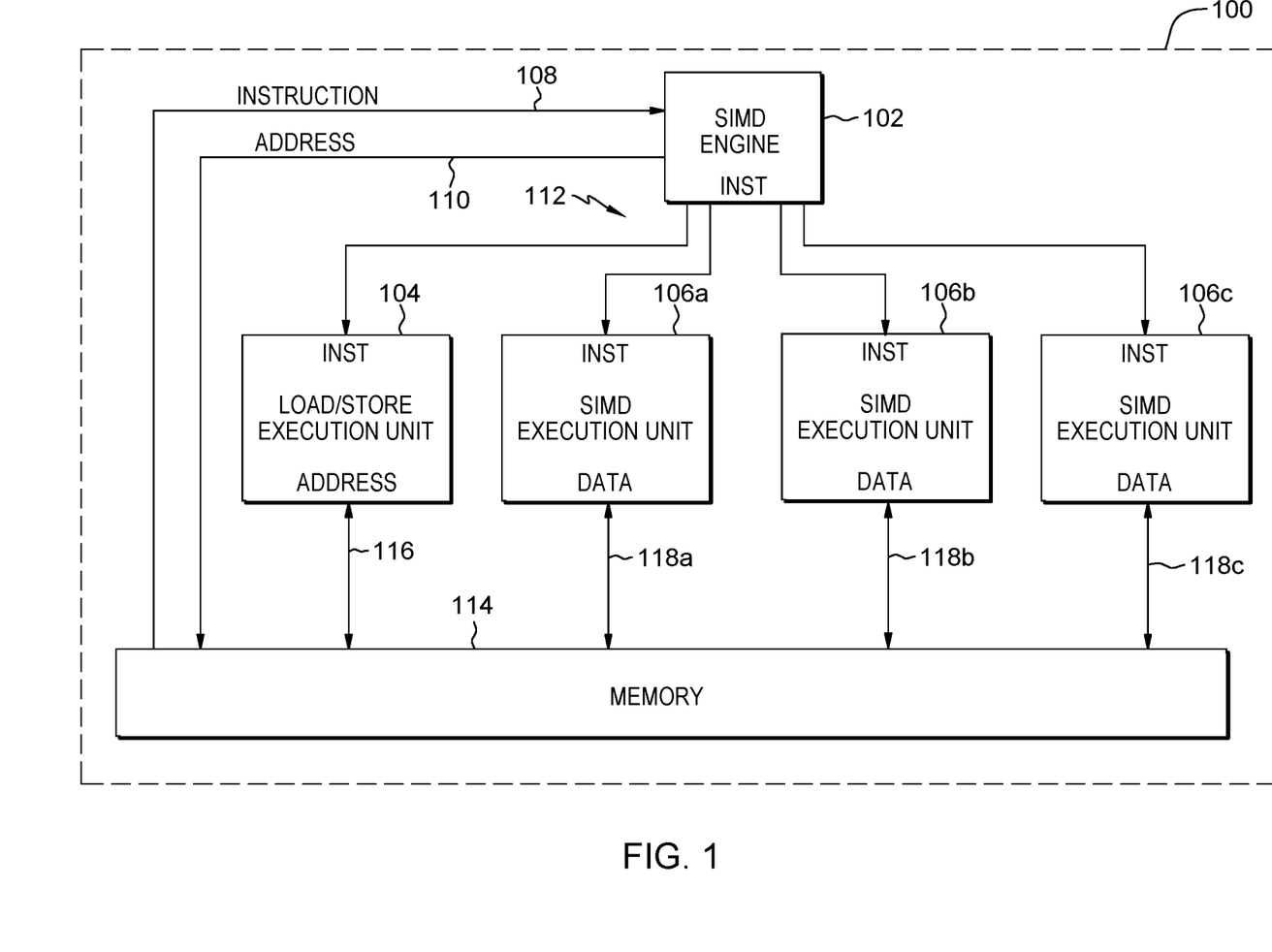
FIG. 1 depicts a high-level block diagram of a data processing system having a plurality of single instruction, multiple data (SIMD) execution units in accordance with embodiments of the present invention.

With reference now to the figures and in particular with reference to FIG. 1, there is depicted a high-level block diagram of a data processing system having a SIMD execution unit in accordance with the embodiments of the present invention. As illustrated, the data processing system 100 includes SIMD engine 102 which is coupled to memory 114 via instruction bus 108 and address bus 110. The SIMD engine 102 fetches instructions from memory 114 and dispatches such instructions to selected SIMD execution units 106a-106c, via instruction dispatch buses 112. The memory 114 may be implemented in different levels having different speeds and capacities. Such levels of memory may be structured such that from the viewpoint of any particular level in the hierarchy, the next lower level from the processor is considered to be a cache. A cache memory is an auxiliary memory that provides a buffering capability by which the relatively slow and increasingly large main memory can interface to the SIMD engine 102 (or a next higher level of memory) at a cycle time much closer to that of the SIMD engine 102.

In the example illustrated in FIG. 1, the plurality of execution units 106a-106c are SIMD execution units. Thus, within the data processing system 100, the SIMD engine 102 interfaces with SIMD execution units 106a-106c as other "execution classes" among the classes of execution units in the data processing system 100. At least in some embodiments the SIMD execution units 106a-106c may be utilized to perform floating-point arithmetic operations among other operations. The SIMD execution units 106a-106c are coupled to the memory 114 via the buses 118a-118c.

Another execution unit within the data processing system 100 may include load/store execution unit 104, for example. The load/store execution unit 104, which is coupled to the memory 114 via the bus 116, is utilized to calculate addresses and provide such addresses to the memory 114 during the execution of instructions that require memory access. The load/store execution unit 104 may be utilized to provide an address to the memory 114 during the execution of instructions in other execution units.

Figure 2:
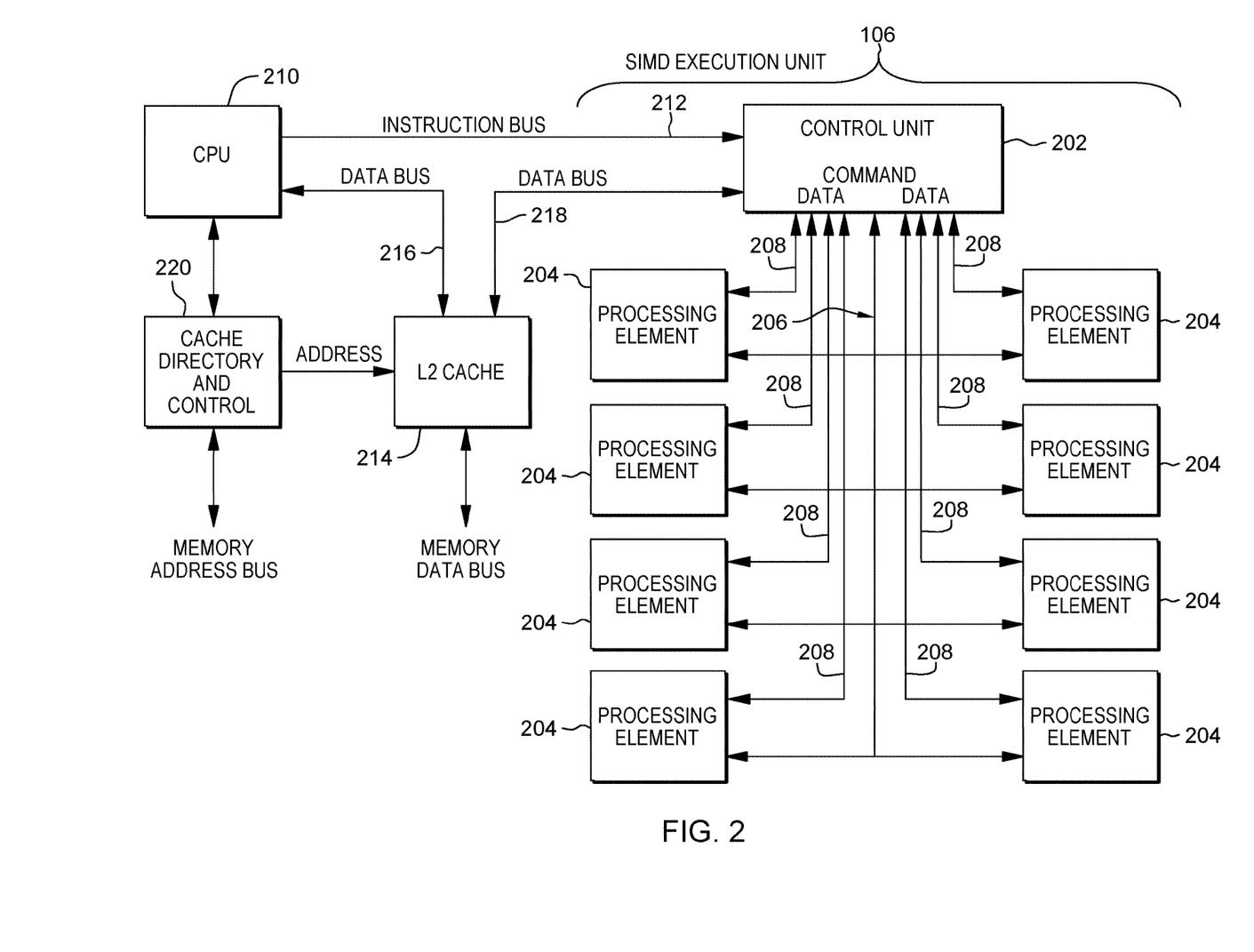
FIG. 2 is a high-level block diagram which illustrates the components within the SIMD execution unit, and the interface between the SIMD execution unit and the data processing system in accordance with embodiments of the present invention.

With reference now to FIG. 2, there is depicted a high-level block diagram which further illustrates the components within the SIMD execution units, and the interface between the SIMD execution units and the data processing system in accordance with embodiments of the present invention. As illustrated, the SIMD execution unit 106 includes a control unit 202 and a plurality of processing elements 204. The control unit 202 dispatches commands to selected processing elements 204 via command bus 206. The control unit 202 transfers data to, and receives data from, the processing elements 204 via the data buses 208. Each processing element 204 is coupled to the control unit 202 with a separate data bus 208.

The control unit 202 receives vector processing instructions from the CPU 210 via an instruction bus 212. Level-two cache (L2 cache) 214 may be used to store data and instructions for all execution units, including SIMD execution unit 106. The L2 cache 214 is coupled to the CPU 210 via the data bus 216. The L2 cache 214 is also coupled to the control unit 202 within the SIMD execution unit 106 via the data bus 218. A cache controller 220 provides address signals to the L2 cache 214. The address utilized to produce such address signals may be computed by the load/store execution unit 104 (see FIG. 1).

Figure 3:
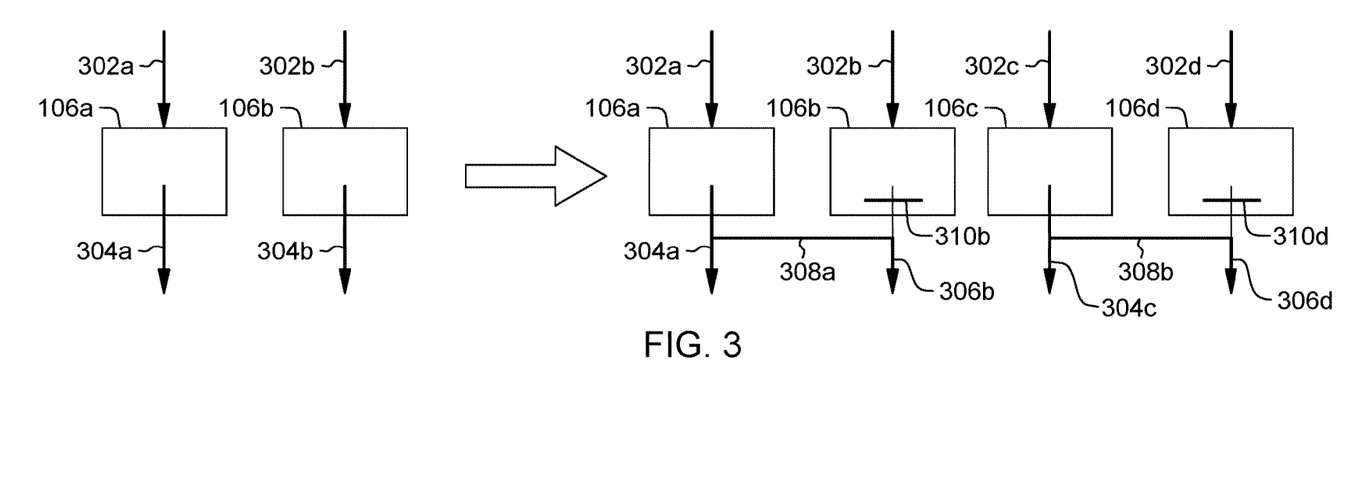
FIG. 3 is a diagram illustrating logic to reuse the unused result outputs of adjacent SIMD execution units, in accordance with embodiments of the present invention.

FIG. 3 is a diagram illustrating logic to reuse the unused result outputs of adjacent SIMD execution units, in accordance with embodiments of the present invention. The SIMD execution units 106a and 106b shown on the left side of FIG. 3 employ the split-instruction transaction model. The SIMD execution units 106a and 106b receive respective inputs 302a and 302b and generate respective outputs 304a and 304b. If the performed operation is expected to produce wider results, the SIMD execution units 106a and 106b perform the operation using multiple cycles. In contrast, in accordance with embodiments of the present invention, the SIMD execution units 106a-106d shown on the right side of FIG. 3 employ both the split-instruction transaction model and a single transaction model and are configured to selectively reuse the unused result outputs of the adjacent SIMD execution units in order to deliver wider results. Advantageously, the disclosed single transaction model significantly increases throughput and reduces latency of the data processing system 100. In addition, the single transaction model removes the need to implement larger result buses 304.

More specifically, the exemplary configuration shown on the right side of FIG. 3 includes a first SIMD execution unit 106a, a second SIMD execution unit 106b, a third SIMD execution unit 106c and a fourth SIMD execution unit 106d. The first SIMD execution unit 106a is connected to the second SIMD execution unit 106b via a first local connection 308a, while the third SIMD execution unit 106c is connected to the fourth SIMD execution unit 106d via a second local connection 308b. As shown in FIG. 3, the second SIMD execution unit 106b and the fourth SIMD execution unit 106d include multiplexers 310b and 310d, respectively. A first multiplexer 310b is configured to select and combine results calculated by the second SIMD execution unit 106b and a part of the result calculated by the adjacent first SIMD execution unit 106a as described herein. A second multiplexer 310d is configured to select and combine results calculated by the fourth SIMD execution unit 106d and a part of the result calculated by the adjacent third SIMD execution unit 106c. It should be noted that the adjacent second SIMD execution unit 106b and the fourth SIMD execution unit 106d are used selectively by the data processing system 100 only if they are available during the performed operation.

In accordance with an embodiment of the present invention, a subset of instructions is implemented, in which the instructions perform calculations directly on the two adjacent SIMD execution units to generate a wider result in one cycle. In one embodiment, the implemented instructions may use binary floating-point data. In particular, one embodiment of the invention removes the need for using additional wiring and logic for putting the results of the execution of the instructions back, allowing them to be executed in one cycle with a small amount of additional logic; thereby, improving performance and reducing power consumption. These instructions include, for instance, Load Lengthened (also may be referred to as Load Extended) instruction. However, since the Load Lengthened instruction operates on binary floating-point numbers, initially, details relating to binary floating-point numbers are provided. A binary floating-point number may have a plurality of formats, including, for instance, 32-, 64- and 128-bit formats, and each format has a representation that includes, for instance, a sign 410, an exponent 412 and a significand 416 (shown in FIG. 4).

Figure 4:
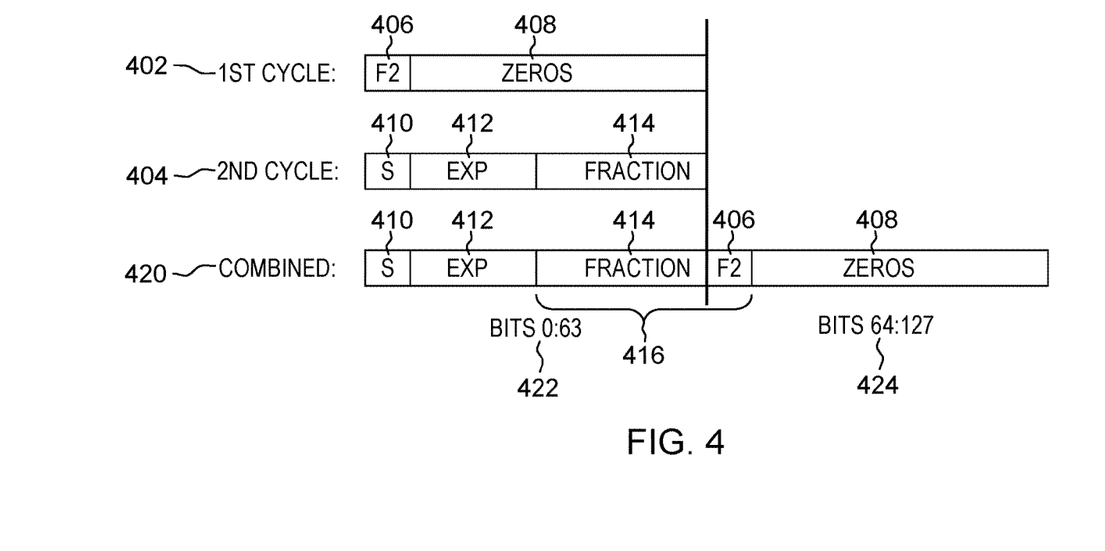
FIG. 4 is a diagram illustrating an enhancement of a vector floating point load lengthened double precision (DP) instruction, in accordance with embodiments of the present invention.

Generally, the load lengthened instruction uses a double precision floating point input and produces an extended double precision floating point output (i.e., output that is larger than the input received by the instruction). FIG. 4 is a diagram illustrating an enhancement of a vector floating point load lengthened double precision (DP) instruction, in accordance with embodiments of the present invention. As shown in FIG. 4, a conventional vector floating point load lengthened instruction requires two cycles—a first cycle 402 and a second cycle 404- to complete its operation using 64 bits. During the first cycle 402, the conventional vector floating point load lengthened instruction performs operation on a portion 406 (e.g., low portion) of the significand 416. The size of the significand 416 is too large to be operated on during the second cycle 404. During the second cycle 404, the conventional vector floating point load lengthened instruction operates on the remaining portions of the floating-point numbers, such as the sign 410, exponent 412 and the second portion 414 (high portion) of the significand 416.

In addition, FIG. 4 illustrates an enhanced vector floating point load lengthened DP instruction 420 implementation in accordance with an embodiment of the present invention. The enhanced vector floating point load lengthened instruction operates on 128 bits 422, 424. In contrast to the conventional vector floating point load lengthened instruction, the enhanced vector floating point load lengthened DP instruction 420 operates on all components 406-414 of the floating-point number in one cycle. As described herein, the enhanced vector floating point load lengthened instruction may utilize the result bus of the adjacent SIMD execution units to complete the operation that produces wider results in one cycle.

In the SIMD computer, as well as other types of computers, a fundamental concept, generally referred to as masking, is required for conditional execution of individual operations in the processing elements. Masking enables the different instructions of an instruction sequence which is applied to the processing elements to only be implemented in those processing elements in which the particular data being applied to the separate processing elements meets the conditions of the particular instructions within the sequence. Different techniques are known in the art which mask a particular processing element from certain instructions in an instruction sequence applied to the processing elements. A detailed summary of contemporary SIMD machines using masking can be found in Horde, R. Michael, "Parallel Supercomputing in SIMD Architectures" 1990 CRC Press Inc, Boca Raton, Fla. Additionally, U.S. Pat. Nos. 4,907,148 and 5,045,995 also provide discussions of masking in these types of systems.

Figure 5:
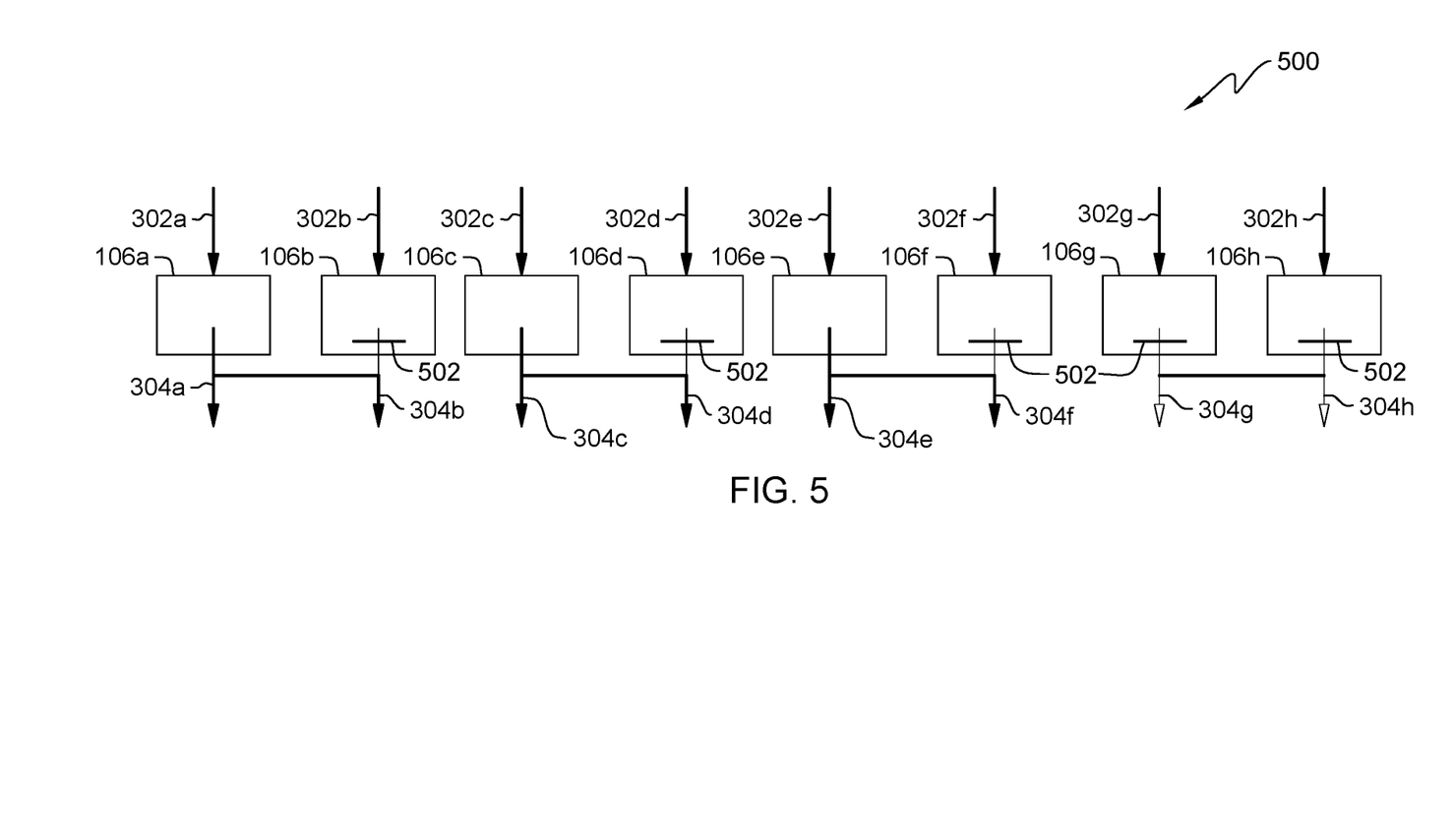
FIG. 5 is a diagram illustrating dynamic lane masking functionality, in accordance with embodiments of the present invention.

FIG. 5 is a diagram illustrating dynamic lane masking functionality, in accordance with embodiments of the present invention. FIG. 5 schematically illustrates an exemplary multiplication operation performed by a SIMD circuit 500 having 8 lanes (SIMD execution units) 106a-106h with lane masking capability. In one embodiment, each of the plurality of the SIMD execution units 106a-106h includes a mask register. In one embodiment, the mask register may further include a mask context register holding a single mask context (MC) bit and a global response flag register holding a single global response flag (GRF) bit. The mask context bit is bit-wise ANDed with the bit selected for masking of a particular machine operation in the instruction in order to either enable or disable the particular SIMD processing element during an instruction call, as will be described in further detail below.

The SIMD execution units 106a-106h within circuitry 500 receive input data elements 302a-302h and based thereon perform the required multiplication resulting in the production of the respective result data elements 304a-304h. Assuming that each of the input data elements are 32-bits wide, then each of the multiplication data elements will be at least 64-bits wide. In addition, the SIMD engine 102 (shown in FIG. 1) includes logic to control selective execution of the instruction by the adjacent SIMD processing elements 106a-106h. The plurality of SIMD execution units 106a-106h are configured to utilize result buses of the adjacent SIMD processing units to produce wider results as described herein. The SIMD engine 102 is configured to instruct selected SIMD execution units 106a-106h to execute current instruction in one cycle. In the example illustrated in FIG. 5, a second SIMD execution unit 106b, fourth SIMD execution unit 106d, sixth SIMD execution unit 106f, seventh SIMD execution unit 106g and the eighth SIMD execution unit 106h are masked out. According to an embodiment of the present invention, the first SIMD execution unit 106a, third SIMD execution unit 106c and fifth SIMD execution unit 106e are configured to use the result buses of the respective adjacent masked SIMD execution units, as shown in FIG. 5. In one embodiment, the adjacent masked SIMD execution units are configured to delay processing of any instructions until corresponding portions of the calculation results are received from the respective SIMD execution units.

Figure 6:
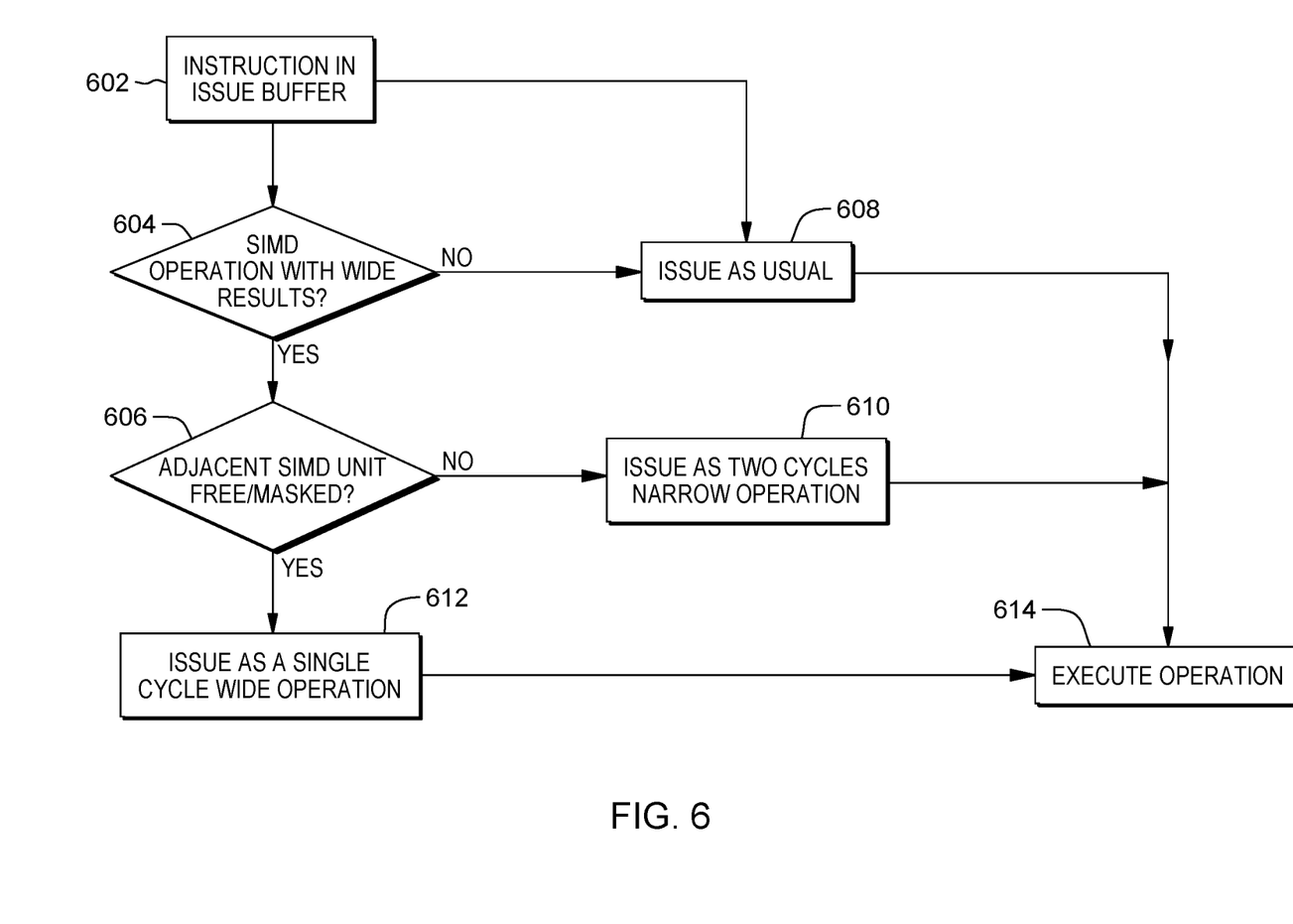
FIG. 6 is a flowchart of a method for reusing adjacent SIMD execution units for fast wide result generation, in accordance with embodiments of the present invention.

FIG. 6 is a flowchart of a method for reusing adjacent SIMD execution units for fast wide result generation, in accordance with embodiments of the present invention. In block 602, the SIMD engine 102 loads the next instruction to be processed into an issue buffer. SIMD instructions are held in the issue buffer until all lane masking dependencies are resolved.

At block 604, the SIMD execution unit 106 determines if the received instruction represents a SIMD operation that produces a wide result. For instance, the SIMD execution unit 106 may be requested to perform multiplication where each input data element is 32-bits wide and the result data element is at least 64-bit wide and wider than the result bus. Some other examples of SIMD operations that produce wider results may include, but are not limited to, conversion from the short format to the long format, conversion from the long format to the extended format, and the like. In response to determining that the received instruction does not represent the operation that produces a wide result (decision block 604, "No" branch), at block 608, the SIMD execution unit 106 issues the instruction in a regular stand-alone mode.

According to an embodiment of the present invention, in response to determining that the received instruction does represent the operation that produces a wide result (decision block 604, "Yes" branch), at block 606, the SIMD execution unit 106 determines if an adjacent SIMD execution unit is available (masked or unused). For example, referring to FIG. 5, the first SIMD execution unit 106a may be configured to determine if the second SIMD execution unit 106b is masked out.

According to an embodiment of the present invention, in response to determining that the adjacent SIMD execution unit is not available (decision block 606, "No" branch), at block 610, the SIMD execution unit 106 issues the instruction as a two-cycle conventional narrow operation 402, 404 shown in FIG. 4. If the SIMD execution unit 106 determines that the adjacent SIMD execution unit is available (decision block 606, "Yes" branch), at block 612, the SIMD execution unit 106 issues the instruction as a novel one-cycle wide operation 420 shown in FIG. 4. At block 614, the SIMD execution unit executes operation associated with the issued instruction.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for processing instructions with extended results, the system comprising:
   a memory having computer readable instructions; and
   one or more processors for executing the computer readable instructions, the one or more processors comprising a first instruction unit and a second instruction unit, the computer readable instructions controlling the one or more processors to perform operations comprising:
   receiving, at the first instruction unit, a processor instruction that produces a result having a data width greater than the width of a first result bus of the first instruction execution unit, the first instruction execution unit coupled to the second instruction execution unit, and the first instruction unit and the second instruction unit configured to perform a same operation on different input data;
   determining whether the second instruction execution unit is masked;
   in response to determining that the second instruction execution unit is masked:
      issuing the processor instruction to the first instruction execution unit as a single cycle wide operation instruction; and
      selectively sending a portion of results calculated by the first instruction execution unit to the second instruction execution unit for output on the second result bus of the second instruction execution unit, wherein the results of the processor instruction are output by the first result bus and the second result bus in the same computational cycle; and
   in response to determining that the second instruction execution unit is not masked:
      issuing the processor instruction to the first instruction execution unit as a two cycle narrow operation instruction; and
      outputting the results calculated by the first instruction execution unit on the first result bus, the outputting in a plurality of computational cycles.

2. The system of claim 1, wherein the first instruction execution unit and the second instruction execution unit comprise single instruction, multiple data (SIMD) processing units and wherein the processor instruction comprises a SIMD instruction.

3. The system of claim 2, wherein the first instruction execution unit and the second instruction execution unit include a mask register and wherein the mask register is configured to store an indication of whether the second instruction unit is masked.

4. The system of claim 1, wherein the width of result data produced by the executed processor instruction is greater than the width of the second result bus.

5. The system of claim 1, wherein the first instruction execution unit is arranged adjacent to the second instruction execution unit.

6. The system of claim 1, wherein the processor instruction includes a vector floating point (FP) load lengthened instruction.

7. The system of claim 1, wherein the processor instruction is executed in one computational cycle.

8. The system of claim 1, wherein the first instruction execution unit and the second instruction execution unit are configured to employ a single transaction model.

9. A method for processing instructions with extended results, the method comprising:
   receiving, at a first instruction unit, a processor instruction that produces a result having a data width greater than the width of a first result bus of the first instruction execution unit, the first instruction execution unit coupled to a second instruction execution unit, and the first instruction unit and the second instruction unit configured to perform a same operation on different input data;
   determining whether the second instruction execution unit is masked;
   in response to determining that the second instruction execution unit is masked:
      issuing the processor instruction to the first instruction execution unit as a single cycle wide operation instruction; and
      selectively sending a portion of results calculated by the first instruction execution unit to the second instruction execution unit for output on the second result bus of the second instruction execution unit, wherein the results of the processor instruction are output by the first result bus and the second result bus in the same computational cycle; and in response to determining that the second instruction execution unit is not masked:
  issuing the processor instruction to the first instruction execution unit as a two cycle narrow operation instruction; and
  outputting the results calculated by the first instruction execution unit on the first result bus, the outputting in a plurality of computational cycles.

10. The method of claim 9, wherein the first instruction execution unit and the second instruction execution unit comprise single instruction, multiple data (SIMD) processing units and wherein the processor instruction comprises a SIMD instruction.

11. The method of claim 10, wherein the first instruction execution unit and the second instruction execution unit include a mask register and wherein the mask register is configured to store an indication of whether the second instruction unit is masked.

12. The method of claim 9, wherein the first instruction execution unit is arranged adjacent to the second instruction execution unit.

13. The method of claim 9, wherein the processor instruction includes a vector floating point (FP) load lengthened instruction.

14. The method of claim 9, wherein the processor instruction is executed in one computational cycle.

15. The method of claim 9, wherein the first instruction execution unit and the second instruction execution unit are configured to employ a single transaction model.

16. A computer-program product for processing instructions with extended results, the computer-program product comprising a computer-readable storage medium having program instructions embodied therewith, the program instructions executable by one or more processors to cause the one or more processors to perform a method comprising:
  receiving, at a first instruction unit, a processor instruction that produces a result having a data width greater than the width of a first result bus of the first instruction execution unit, the first instruction execution unit coupled to a second instruction execution unit, and the first instruction unit and the second instruction unit configured to perform a same operation on different input data;
  determining whether the second instruction execution unit is masked;
  in response to determining that the second instruction execution unit is masked:
    issuing the processor instruction to the first instruction execution unit as a single cycle wide operation instruction; and
    selectively sending a portion of results calculated by the first instruction execution unit to the second instruction execution unit for output on the second result bus of the second instruction execution unit,
    wherein the results of the processor instruction are output by the first result bus and the second result bus in the same computational cycle; and
  in response to determining that the second instruction execution unit is not masked:
    issuing the processor instruction to the first instruction execution unit as a two cycle narrow operation instruction; and
    outputting the results calculated by the first instruction execution unit on the first result bus, the outputting in a plurality of computational cycles.

17. The computer-program product of claim 16, wherein the first instruction execution unit and the second instruction execution unit comprise single instruction, multiple data (SIMD) processing units and wherein the processor instruction comprises a SIMD instruction.

* * * * *